United States Patent
Bosch et al.

(10) Patent No.: US 7,974,228 B2
(45) Date of Patent: Jul. 5, 2011

(54) METHOD OF SIGNALING-FREE IDLE MODE MOBILITY FOR AN INTEGRATED 3GPP AND 3GPP2 NETWORK

(75) Inventors: Peter Bosch, New Providence, NJ (US); Laurent Thiebaut, Paris (FR)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 745 days.

(21) Appl. No.: 11/970,139

(22) Filed: Jan. 7, 2008

(65) Prior Publication Data

US 2009/0176513 A1    Jul. 9, 2009

(51) Int. Cl.
*H04B 7/24* (2006.01)
*H04W 4/00* (2009.01)
*H04W 68/02* (2009.01)

(52) U.S. Cl. ......... 370/315; 370/331; 370/338; 455/458

(58) Field of Classification Search .......... 370/310–350; 455/404.2–414.2, 432.1–444, 456.1–461
See application file for complete search history.

(56) References Cited

U.S. PATENT DOCUMENTS

| | | | | |
|---|---|---|---|---|
| 2006/0229068 | A1* | 10/2006 | Niemela et al. | 455/426.1 |
| 2007/0021120 | A1* | 1/2007 | Flore et al. | 455/436 |
| 2009/0036130 | A1* | 2/2009 | Diachina et al. | 455/436 |
| 2009/0213762 | A1* | 8/2009 | Guo et al. | 370/254 |
| 2009/0318147 | A1* | 12/2009 | Zhang et al. | 455/435.1 |
| 2010/0046438 | A1* | 2/2010 | Hu | 370/328 |
| 2010/0172336 | A1* | 7/2010 | Pehrsson et al. | 370/338 |
| 2010/0182953 | A1* | 7/2010 | Zhu et al. | 370/328 |
| 2010/0265884 | A1* | 10/2010 | Vikberg et al. | 370/328 |

OTHER PUBLICATIONS

Siemens, "*Limiting signalling due to idle mode mobility between E-UTRA and UTRA/GSM*" Rel. 7/SAE; 3GPP TSG SA WG2 Architecture—S2#53, Jun. 26-30, 2006 S2-062297 Lisbon, Portual.
*Long Term Evolution (LTE) Motorola* pp. 1-15, Apr. 2008.
International PCT Search Report PCT/US2009/000072 dated Sep. 9, 2009.
Written Opinion based on International PCT Search Report PCT/US2009/000072 dated Sep. 9, 2009.
Wang W et al., "A predictive paging scheme for IMT-2000 systems" Vehicular Technology Conference, 2000 IEEE VTS Fall VTC 2000, $52^{nd}$, Sep. 24-28, 2000, Piscataway, NJ, USA, IEEE, vol. 3, Sep. 24, 2000, pp. 1424-1430, XP010524728.

* cited by examiner

*Primary Examiner* — Tri H Phan
(74) *Attorney, Agent, or Firm* — Williams, Morgan & Amerson, PC

(57) ABSTRACT

The present invention provides a method of operating a paging controller in a wireless communication system including a first network that operates according to a first radio access technology and a second network that operates according to a second radio access technology. The first network includes a first control plane entity and the second network includes a second control plane entity. The method includes providing, to at least one first base station in the first network, a request to transmit a page to a first tracking area associated with the mobile unit. The first tracking area is defined in the first network. The method also includes providing, via an interface between the first control plane entity and the second control plane entity, a request to transmit the page to a second tracking area associated with the mobile unit. The second tracking area is defined in the second network.

16 Claims, 3 Drawing Sheets

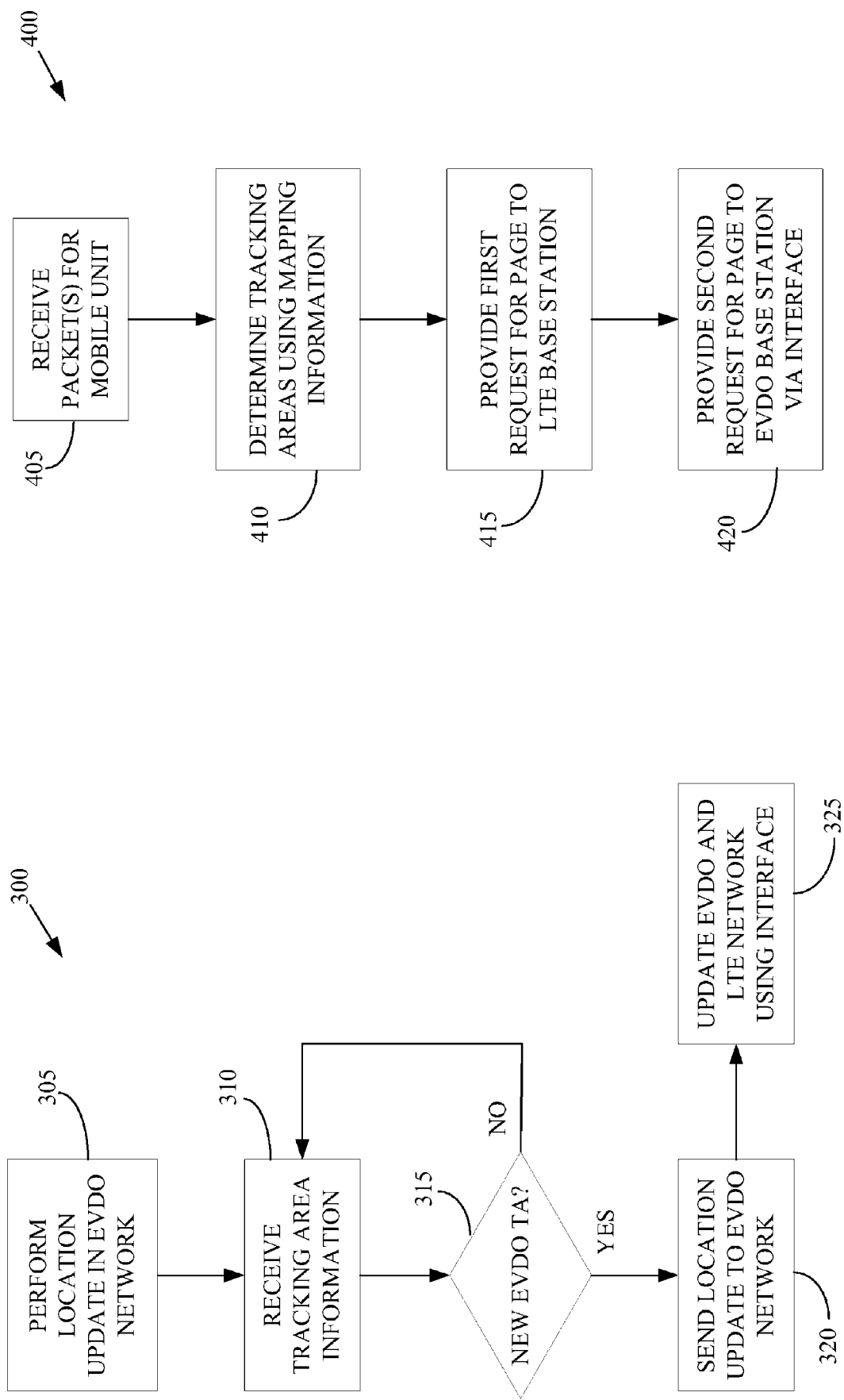

METHOD OF SIGNALING-FREE IDLE MODE MOBILITY FOR AN INTEGRATED 3GPP AND 3GPP2 NETWORK

BACKGROUND OF THE INVENTION

1. Field of the Invention

This invention relates generally to communication systems, and, more particularly, to wireless communication systems.

2. Description of the Related Art

Wireless communication systems typically include one or more base stations or access points, which are part of the mobile network, for providing wireless connectivity to mobile units in a geographic area (such as a cell or sector) associated with each base station or access point. To initiate communication between a mobile unit and a base station, the mobile unit and the base station must establish a session. For this, the mobile unit attaches to the network, thereby creating in the network a "UE context" that includes information indicating values of various session parameters. UE context information may be transferred from one base station (or other network node) to another as the mobile unit moves between the cells, e.g., as part of a handover algorithm. Once a UE context has been established between the mobile unit and the base station, the mobile unit and the base station may form a wireless communication link, or air interface, which may be used to transmit modulated radiofrequency signals based on the session parameters. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, control channels, and the like.

Establishment of the communication session and/or wireless communication link is performed according to wireless communication standards and/or protocols. For example, members of the Third Generation Partnership Projects (3GPP, 3GPP2) establish and agree to standards and/or protocols that may then be adopted by service providers for implementing their wireless communication systems. Adopting the agreed-upon standards and/or protocols permits service providers to cooperate in providing wireless communication service to subscribers. Examples of current and legacy wireless communication systems include General Packet Radio Source (GPRS) systems that operate according to the second and/or third generations (2G and 3G) of the 3GPP standards and/or protocols. The 3G systems may also be referred to as Universal Mobile Telecommunication Systems (UMTS). New standards and/or protocols, such as the Long Term Evolution/System Architecture Evolution (LTE/SAE) standards and/or protocols, are currently under discussion by the 3GPP. Examples of the standards proposed by the 3GPP2 standardization body are CDMA 1× and CDMA EvDO.

Mobile units may have an active or an idle wireless communication link with one or more base stations. Active communication links are used when the mobile unit is actively transmitting and/or receiving information from the base station. When an active mobile unit moves, it may be handed off from a source base station to a target base station. Active mobile units may also be handed off from a source base station to a target base station when the quality of the wireless communication link to the source base station falls below the quality of a wireless communication link of a target base station due to changes in environmental conditions and/or transmission parameters of the source and/or target base stations. In the idle mode, a mobile unit may periodically reselect a preferred base station and synchronize to the corresponding broadcast paging interval. However, the idle mobile unit need not inform the new base station that it has been selected as the preferred base station. Thus, states associated with the mobile unit may not be moved until the mobile unit leaves the idle mode when forward link and/or reverse link traffic resumes.

When information becomes available for an idle mobile unit the wireless communication system transmits a paging message indicating that the information is available and requesting that the mobile unit enter the active mode to receive the information. However, as discussed above, idle mobile units are not required to notify base stations when they have been selected as the preferred base station. Consequently, the wireless communication system may not know the exact location of the idle mobile unit and therefore may be required to provide paging messages to numerous cells or sectors. Conventional wireless communication systems attempt to balance the competing desire to reduce overhead associated with transmitting location update messages and the desire to reduce overhead associated with transmitting paging messages by defining tracking areas (or routing areas) that include a plurality of cells or sectors served by a plurality of base stations. Idle mobile units may then be required to transmit a location update message when it crosses the boundary between two tracking areas. Thus, the wireless communication system knows that the idle mobile unit is most likely within the tracking area indicated in the most recent location update message and so may begin the paging processed by providing paging messages via the base stations within the tracking area.

In the real world, wireless connectivity is provided to mobile units using multiple wireless communication systems, some of which may operate according to the most recent standards and/or protocols and some of which may operate according to one or more legacy standards and/or protocols. For example, the new LTE/SAE wireless communication system may be initially deployed by overlaying the system with existing legacy 2G/3G/UMTS wireless communication systems. The new and legacy wireless communication systems utilize different radio access technologies (RATs) that operate according to different standards and/or protocols. The legacy 2G/3G/UMTS wireless communication systems are expected to be, at least initially, more mature than the new LTE/SAE wireless communication systems and therefore the legacy wireless communication systems are expected to provide, at least initially, better and more reliable coverage. Consequently, mobile units are likely to utilize legacy wireless communication systems when coverage from the new wireless communication system is lost or not available.

Transitions between new and legacy wireless communication systems may generate a relatively large amount of signaling traffic, at least in part because both the new and legacy wireless communication systems may define overlapping sets of tracking areas. Consequently, the mobile unit may need to provide two location update messages every time it crosses a boundary between tracking areas associated with the new and/or legacy wireless communication systems. For example, if the mobile unit transitions from a tracking area associated with the new wireless communication system into a tracking area associated with the legacy wireless communication system, the mobile unit may provide location update messages to both the new and the legacy wireless communication system. The transitions may be the result of movement of the mobile unit, e.g., when a roaming mobile unit crosses a boundary between coverage areas of the new and legacy wireless communication systems, or the result of changing system or environmental conditions, e.g., when the channel quality provided by the new and/or legacy wireless communication system changes and triggers a transition between the new and legacy wireless communication systems.

The amount of signaling traffic generated by location update messages may also be particularly large when the new wireless communication system is first deployed because the coverage provided by the new wireless communication system may be patchy, resulting in relatively large numbers of transitions between the new and legacy wireless communication systems. The number of calls that are dropped by the new and/or legacy wireless communication systems may increase when the signaling traffic increases. Accordingly, the number of call drops may be undesirably large when the new wireless communication system is first deployed. Furthermore, a tracking area update triggered by a location update message that is transmitted by transitions between tracking areas maintained by different wireless communication systems results in the source wireless communication system releasing information (also known as a context) associated with the mobile unit. This context information must be re-created if the mobile unit transitions back to the original wireless communication system, which may lead to excessive resource consumption if the mobile unit frequently flip-flops between different wireless communication systems.

In order to minimize the network signaling generated by mobile units that move across boundaries between new (e.g., LTE) and legacy (e.g., HSDPA, UMTS, EDGE, and GPRS) radio access technologies defined by the 3GPP standards, mobile units may be assigned to tracking areas and/or routing areas associated with both radio access technologies. The paging and location update functions for both the new and legacy radio access technologies may be maintained in a single network control plane entity, such as the mobility management entity (MME). Consequently, the mobile unit does not need to transmit location update messages as long as it is moving among cells a broadcast one of the equivalent tracking area or routing area identities. When new traffic arrives for the mobile unit, the mobile unit may be paged using those technologies. However, tight coordination of the paging and location update functions of the 3GPP radio access technologies with other radio access technologies (e.g., 3GPP2 and IEEE radio access technologies) is not possible because the non-3GPP radio access technologies implement different control plane entities, such as radio network controllers.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for operating a paging controller in a wireless communication system including a first network that operates according to a first radio access technology and a second network that operates according to a second radio access technology. The first network includes a first control plane entity and the second network includes a second control plane entity. The method includes providing, to at least one first base station in the first network, a request to transmit a page to a first tracking area associated with the mobile unit. The first tracking area is defined in the first network. The method also includes providing, via an interface between the first control plane entity and the second control plane entity, a request to transmit the page to a second tracking area associated with the mobile unit. The second tracking area is defined in the second network.

In another embodiment of the present invention, a method is provided for operating a mobile unit in a wireless communication system including a first network that operates according to a first radio access technology and a second network that operates according to a second radio access technology. The first network includes a first control plane entity and the second network includes a second control plane entity. The method includes providing, in response to entering a first tracking area in the first network, a location update message indicating the identity of the mobile unit. The first and second networks can use the location update message to associate the mobile unit with the first tracking area and at least one second tracking area in the second network using information communicated via an interface between the first control plane entity and the second control plane entity.

BRIEF DESCRIPTION OF THE DRAWINGS

The invention may be understood by reference to the following description taken in conjunction with the accompanying drawings, in which like reference numerals identify like elements, and in which:

FIG. 3 conceptually illustrates one exemplary embodiment of a method of providing location update messages in a wireless communication system, in accordance with the present invention; and FIG. 4 conceptually illustrates one exemplary embodiment of a method of providing a page in a wireless communication system, in accordance with the present invention.

Figure 1:
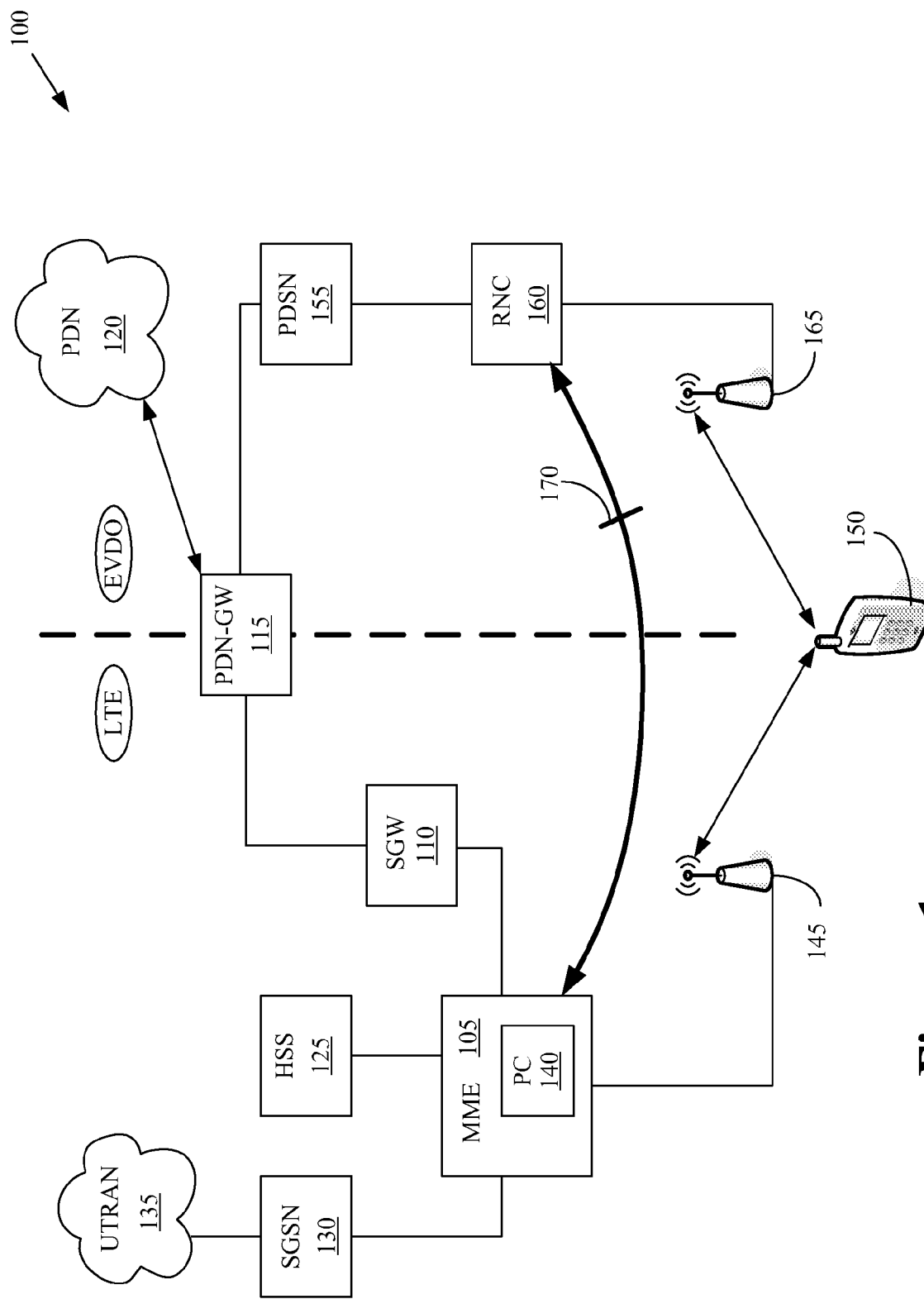
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes multiple networks that operate according to different radio access technologies or wireless access technologies. The two radio access technologies shown in FIG. 1 operate according to different standards and/or protocols. For example, the two radio access technologies shown in FIG. 1 operate according to the Long Term Evolution (LTE) standards defined by the Third Generation Partnership Project (3GPP) and the Evolved, Data Optimized (EvDO) standards defined by 3GPP2. However, persons of ordinary skill in the art having benefit of the present disclosure should appreciate that the present invention is not limited to this particular combination of radio access technologies. For example, one or more of the networks may operate according to IEEE standards and/or protocols. Furthermore, the present invention is not limited to wireless communication systems 100 that include two networks that operate according to different radio access technologies. In alternative embodiments, the wireless communication system 100 may include any number of networks.

The LTE network includes a mobility management entity (MME) 105 that is communicatively connected to a serving gateway (SGW) 110. The serving gateway 110 routes and forwards user data packets, as well as acting as a mobility anchor for the user plane during handovers. The serving gateway 110 may also terminate the downlink data path for idle users and trigger paging when downlink data arrives for idle users, e.g., from a Packet Data Network Gateway (PDN-GW) 115 that is in communication with the target packet data network (PDN) 120 such as an Internet or an Intranet where an operator provides its own services such as IMS (VoIP), MMS, and the like. The Packet Data Network Gateway 115 may act as an anchor for mobility between various networks, including the LTE network and the EvDO network. The mobility management entity 105 is also connected to a home subscriber server (HSS) 125 that may implement database functions such as a home location register, and security and network access databases. A serving GPRS support node (SGSN) 130 provides a connection between the mobility management entity 105 and a legacy 3GPP radio access such as a universal terrestrial radio access network (UTRAN) 135. Techniques for implementing and/or operating the functional entities in the LTE network are known in the art and in the interest of clarity only those aspects of implementing and/or operating these entities that are relevant to the present invention will be discussed herein.

Control plane functions in the LTE network are implemented in the mobility management entity 105. The mobility management entity 105 may be responsible for idle mode tracking of mobile units and paging procedures including retransmissions. The mobility management entity 105 may also be involved in the activation/deactivation processes and may select the appropriate serving gateway 110 when users initially attach to the LTE network and/or during handover. User authentication may also be performed by the mobility management entity 105, e.g., by interacting with the home subscriber server 125. Temporary user identities can be assigned by the mobility management entity 105 and the mobility management entity 135 may provide control plane functions for mobility between the LTE network and other networks such as 2G/3G access networks and the EvDO network. The mobility management entity 105 is also connected to one or more enhanced node-Bs (which may also be referred to as e-NBs or base stations) 145 that provide wireless connectivity to mobile units 150 in the wireless communication system 100. The mobile units 150 are multiple-mode entities that can communicate with the LTE network and/or the EvDO network, as well as possibly being able to communicate with other types of networks.

In the illustrated embodiment, the mobility management entity 105 also implements a paging controller (PC) 140 that is responsible for coordinating the paging and location update processes described herein. For example, the paging controller 140 may be responsible for providing requests to transmit paging messages in response to receiving an indication that incoming data is available for one or more idle users. The paging controller 140 may also receive location update messages from idle users and use these to maintain and/or update a database indicating a location (e.g., a tracking area or routing area) associated with each registered idle user. However, persons of ordinary skill in the art having benefit of the present disclosure should appreciate that the paging controller 140 does not need to be implemented in the mobility management entity 105 and in alternative embodiments could be implemented in other entities or it could be a stand-alone entity.

The EvDO network includes a packet data serving node (PDSN) 155 is coupled to the Packet Data Network Gateway 115. The packet data serving node 155 may be responsible for establishing, maintaining, and/or terminating user sessions such as point-to-point protocol (PPP) sessions towards the mobile unit 150. The packet data serving node 155 may also assign dynamic IP addresses and/or support mobile IP functionality. Alternatively, the EvDO network could include an HRPD serving gateway (HSGW) that may be coupled to the Packet Data Network Gateway 115. The HGSW could also be combined with the LTE SGW 110 in some embodiments. Control plane functions in the EvDO network are supported by a radio network controller (RNC) 160, which is typically responsible for controlling the use and the reliability of radio resources such as the resources used by a base station 165 to provide wireless connectivity to mobile units 150. The radio network controller 160 may also be responsible for providing paging requests and receiving location update messages. For example, the radio network controller 160 may signal the base station 165 to provide a paging request to attempt to locate the mobile unit 150 when the mobile unit 150 is in the idle mode. The radio network controller 160 may also receive location update messages from the idle mobile unit 150 and use these to maintain and/or update a database indicating a location (e.g., a tracking area or routing area) associated with each registered idle user.

The LTE network and the EvDO network in FIG. 1 may provide wireless connectivity to overlapping coverage areas. For example, the coverage area of the base station 145 may at least partially overlap with the coverage area of the base station 165. In one embodiment, the EvDO network is a legacy underlay network that provides substantially ubiquitous coverage within a particular geographic area. Persons of ordinary skill in the art having benefit of the present disclosure should appreciate that the term "substantially ubiquitous coverage" is intended to mean that under ideal conditions the EvDO network should be able to provide wireless connectivity over the entire geographic area of interest. However, various factors such as man-made obstructions, geographical features, and/or environmental conditions may result in poor or nonexistent coverage in certain locations within the geographic area. The location of these coverage holes may vary in time and may also be a function of operational characteristics of the base stations 165 and/or the mobile unit 150. The LTE network may be an overlay network that provides coverage to particular regions within the geographical area that receives substantially ubiquitous coverage from the EvDO network. For example, the LTE network may be in the process of being deployed and so may provide coverage to a limited area or may provide coverage in areas (e.g. deep in-door or underground) where EvDO service is not reachable.

Figure 2:
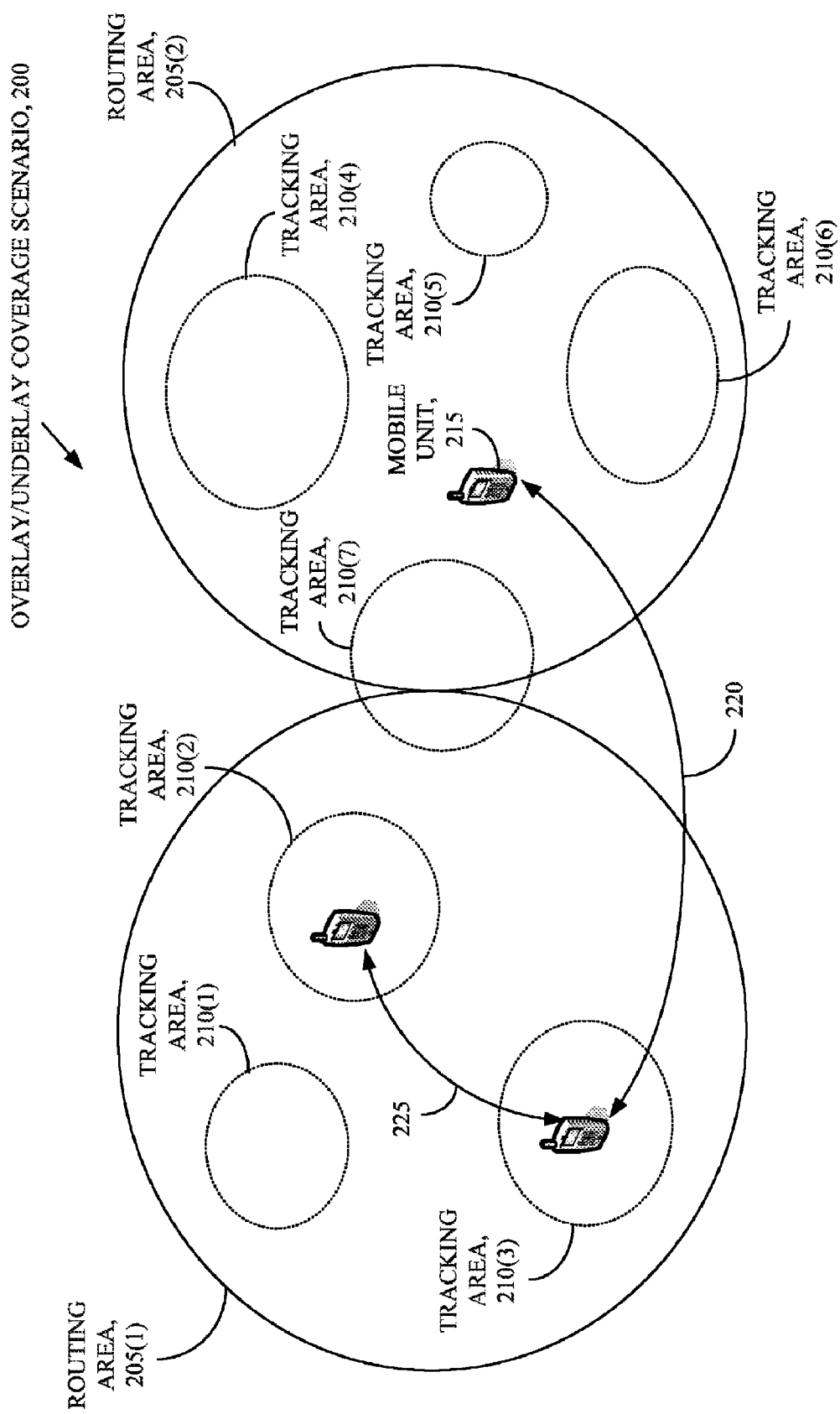
FIG. 2 conceptually illustrates one exemplary embodiment of an overlay/underlay coverage area, in accordance with the present invention.

FIG. 2 conceptually illustrates one exemplary embodiment of an overlay/underlay coverage scenario 200. In the illustrated embodiment, substantially ubiquitous coverage is provided to geographic areas or cells included in the routing areas 205 by an underlay network, such as the EvDO network. Each routing area 205 may include one or more cells or sectors associated with one or more base stations. Additional overlapping coverage is also provided to cells included in the tracking areas 210 by an overlay network, such as the LTE network. Each tracking area 210 may include one or more cells or sectors associated with one or more base stations. Although the areas 205, 210 are depicted as circles in FIG. 2, persons of ordinary skill in the art having benefit of the present disclosure should appreciate that this is an idealization. In practice, the boundaries of the areas 205, 210 may be irregular and/or time varying.

A mobile unit 215 can move through the coverage area 200 and therefore may be capable of receiving coverage from base stations within the tracking areas 210 and/or the routing areas 205. If the mobile unit 215 is in the idle mode, it may provide location update messages via the base stations in the tracking and/or routing areas 205, 210. At least in part to reduce overhead and/or battery consumption, the mobile unit 215 may not provide location update messages every time it enters a new tracking or routing area 205, 210. In the illustrated embodiment, the mobile unit 215 may only transmit a location update message when it enters a new tracking area 205 of the underlay network, as indicated by the arrow 220. The mobile unit 215 may bypass transmission of location update messages when it moves between routing areas 210 within a tracking area 205, as indicated by the arrow 225. Routing areas 210 that overlap multiple tracking areas 205, such as the routing area 210(7), may be considered to be part of all of the tracking areas 205 that they overlap. In one embodiment, the wireless communication system informs the mobile unit 215 of the relationships between the tracking and routing areas 205, 210 (e.g., using broadcast and/or unicast messages transmitted periodically or following terminal registration). The mobile unit 215 may then use this information to determine when to provide location update messages.

Paging messages destined for the mobile unit 215 can be transmitted via the overlay and the underlay networks using the location update information provided by the mobile unit 215. For example, if the most recent location update message indicates that the mobile unit 215 is located in the tracking area 205(1), then a paging message may be provided to the tracking area 205(1) using base stations in the underlay network. The wireless communication system may also use mapping information and/or database information to determine that the routing areas 210(1-3) are in the tracking area 205(1). Additional paging messages may also be provided to the routing areas 210(1-3) using base stations in the overlay network. Coordination of the control plane entities in the underlay and overlay network may be performed over an interface between these entities. For example, when the underlay network receives a location update message, it should update its own location database and also inform the overlay network so that the overlay network can update its database of locations. The location update information may also be passed transparently to the mobile unit via an interface between control plane entities and the corresponding base station radio.

Referring back to FIG. 1, control plane entities in the various networks included in the wireless communication system 100, e.g., the mobility management entity 105 in the LTE network and the radio network controller 160 in the EvDO network, can communicate over an interface 170. The interface 170 is used to coordinate paging and location update procedures to provide signaling-free idle mode mobility to the mobile unit 150. In one embodiment, the control plane entities 105, 160 may use the interface 170 to broadcast a single paging message over the LTE network and the EvDO network. For example, when the paging controller 140 is aware that information has arrived from the Packet Data Network 120 for the mobile unit 150, the paging controller 140 may instruct the base station 145 to provide a paging message to a tracking area indicated by the mobile unit 150 in a previous location update message. The paging message may be addressed to the mobile unit 150 using an addressing scheme or identifier generated by the LTE network, such as a TMSI, U-RNTI, UATI, and the like.

The paging controller 140 may also use the interface 170 to instruct the radio network controller 160 to initiate a paging process to a routing area of the EvDO network that is overlapping the tracking area associated with the mobile unit 150. For example, the paging controller 140 may use a locally maintained location database to determine the routing areas in the EvDO network that overlap the tracking area associated with the mobile unit 150. The paging controller 140 may then transmit a request to the radio network controller 160 to page the mobile unit 150 in the determined routing areas. Alternatively, the paging controller 140 may transmit information indicating the tracking area associated with the mobile unit 150 and the radio network controller 160 may determine the routing areas that should be paged, e.g. based on a locally maintained location database. In some cases, the EvDO network may use a different addressing scheme or mobile unit identifier that is used in the LTE network. The paging controller 140 and/or the radio network controller 160 may therefore implement a mapping function to map the mobile unit identities between the two networks.

When a location update message is received from the mobile unit 150, the interface 170 may be used to register the mobile unit 150 to the relevant tracking areas and/or routing areas. In one embodiment, location update messages that are received in one of the networks result in automatic location updating of the mobile unit 150 in the other network. For example, the paging controller 140 may update its location database when the mobility management entity 105 receives a location update message from the mobile unit 150 indicating that the mobile unit 150 has moved into a new tracking area of the LTE network. The mobility management entity 105 may also transmit the location update information over the interface 170 so that the radio network controller 160 can update the corresponding entries in its location database. The entries in the location databases may include the current tracking areas in the LTE network, the associated routing areas in the EvDO network, the mobile unit identifiers for the two networks, and any other information. Coordinating the location update information using the interface 170 may therefore reduce or eliminate the need for providing potentially redundant location update messages to multiple networks in the wireless communication system 100.

In one embodiment, information such as LTE Mobility Management information may be passed from the mobility management entity 105 to the mobile unit 150 when the radio network controller 160 sends the location update to the mobility management entity 105 on behalf of the mobile unit 150. The LTE Mobility Management information may include NITZ information (Time Zone), a list of emergency numbers in the area, and the like. Such information is relayed transparently via the interface 170 to the message sent back to the mobile unit 150. The mobility management information may also include periodic location update timer information that can be used to minimize periodic update timers used by the mobile unit 150. For example, the mobile unit 150 may set the periodic location update timers based on awareness that the interface 170 is available for communication between the networks and by considering a minimum of values for the periodic location update timer information provided by the control plane entity of the first network and by the control plane entity of the second network.

FIG. 3 conceptually illustrates one exemplary embodiment of a method 300 of providing location update messages in a wireless communication system. In the illustrated embodiment, the wireless communication system includes both a CDMA2000 EvDO network and a 3GPP SAE LTE network. Both the EvDO network and the LTE network are anchored under a PDN gateway, which connects to a 3GPP2 PDSN (or HSGW) over a mobile IP interface. The PDSN then connects to a radio network controller and a base transceiver station. On the 3GPP LTE network side, the PDN connects to a serving gateway over a mobile IP interface or a GTP interface. The serving gateway then connects to a mobility management entity and a 3GPP e-NB. The mobility management entity and the radio network controller maintain an open interface. In the illustrated embodiment, the mobile unit is a dual-mode EvDO/LTE handset that is connected to the user equipment and is capable of communicating with the overlay LTE network and the underlay EvDO network.

The mobile unit may perform (at 305) a location update procedure in an available EvDO network coverage area and may be assigned to (or associated with) a corresponding tracking area. As part of the registration procedure, the mobile unit may receive a temporary identity such as a UATI. The mobile unit may then receive (at 310) information indicating its current tracking area. For example, the EvDO network may broadcast or unicast the tracking area information to the mobile unit. In one embodiment, when the EvDO network knows that the mobile unit is already registered over LTE, the EvDO network may also execute a tracking area update procedure and use the control plane interface to notify the LTE network that the mobile unit has changed location (at 305) and been assigned a LTE tracking area by the EvDO network. For example, tracking area registration messages may be transmitted over the control plane interface. Alternatively, the mobile unit may register itself in the LTE network based on the LTE routing area information that may be broadcast on an EvDO overhead channel. In this case, the mobile unit may use LTE signaling messages that may be exchanged over the EvDO radio network and tunneled via the control interface 170 to the Paging Controller (140). During this signaling exchange, the control plane interface may carry the identities of the respective technologies so that the LTE network learns of the mobile unit's EvDO identity and the EvDO network learns of the mobile unit's LTE identity.

The idle mobile units may then monitor (at 315) tracking area information broadcast by the radio network on which it is camping (e.g. EvDO or LTE), the technology on which the mobile unit is camping may be determined according to broadcast network camping policy information. As long as the mobile unit does not exit the tracking area it is registered on, the mobile unit may remain idle or dormant while continuing to receive (at 310) and monitor (at 315) the tracking area information. If the mobile unit determines (at 315) that it is entering a tracking area on which it is not registered (e.g. on EvDO), then the mobile unit may send (at 320) a location update message to the network corresponding to that tracking area (e.g. EvDO). The control plane entity (e.g. in the EvDO network) may then use the control plane interface to inform (at 325) the corresponding control plane entity in the other (e.g. LTE) network that the mobile unit has moved to a new tracking area.

The wireless communication system may automatically de-register the mobile unit (e.g. at the expiry of a re-registration update timer) and the control plane entity (e.g. in the EvDO network) may then use the control plane interface to inform (at 325) the corresponding control plane entity in the other (e.g. LTE) network that the mobile unit has been de-registered.

FIG. 4 conceptually illustrates one exemplary embodiment of a method 400 of providing a page in a wireless communication system. In the illustrated embodiment, the control plane interface is exercised to page a mobile unit in the EvDO network when a message arrives from the packet data network into the 3GPP LTE serving gateway for a mobile unit that is registered in both the LTE and EvDO networks. The packet data network gateway 115 may receive (at 405) one or more packets that are destined for the mobile unit. If the mobile unit is bound to the LTE network, the packet data network gateway 115 forwards these packets to the serving gateway in the LTE network, which may inform the mobility management entity of the incoming messages. The mobility management entity may then determine (at 410) the tracking area(s) associated with the mobile unit (over LTE) and provide (at 415) a request for the LTE base station to transmit a page to the determined tracking area(s). The mobility management entity may also use the control plane interface to provide (at 420) a request to have the EvDO base station send paging messages to one or more (EvDO) routing areas associated with the determined tracking area. The LTE network may transmit information indicating the UATI over the control plane interface in order to page the mobile with the correct identity over EvDO.

Alternatively, if the mobile unit is bound to the EvDO network, the packet data network gateway 115 forwards these packets to the PDSN in the EvDO network, which may inform the control plane entity (e.g., the radio network controller) of the incoming messages. The radio network controller may then determine (at 410) the routing area associated with the mobile unit and provide (at 415) a request for the EvDO base station to transmit a page to the determined routing area(s). The radio network controller may also use the control plane interface to provide (at 420) a request to have the mobility management entity instruct the LTE base station to provide paging messages to one or more tracking areas associated with the determined routing area(s). The EvDO network may transmit the corresponding LTE identity over the control plane interface in order to page the mobile with the correct identity over LTE. Alternate paging strategies can be considered as well.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method of operating a paging controller in a wireless communication system including a first network that operates according to a first radio access technology and a second network that operates according to a second radio access technology, the first network including a first control plane entity and the second network including a second control plane entity, comprising:
    providing, to at least one first base station in the first network, a request to transmit a page to a first tracking area associated with a mobile unit, the first tracking area being defined in the first network;
    providing, via an interface between the first control plane entity and the second control plane entity, a request to transmit the page to a second tracking area associated with the mobile unit, the second tracking area being defined in the second networked; and
    providing, to the mobile unit, information indicating the relationships between the tracking areas and routing areas over the first and the second networks.

2. The method of claim 1, wherein providing the request to transmit the page to the first tracking area comprises providing a request including a first mobile unit identifier defined in the first network.

3. The method of claim 2, wherein providing the request to transmit the page to the second tracking area comprises providing a request including a second mobile unit identifier defined in the second network.

4. The method of claim 3, comprising at least one of mapping the first mobile unit identifier to the second mobile unit identifier or mapping the paging areas between the first and the second networks.

5. The method of claim 1, comprising passing location update network information from the control plane entity of the first or second network to the mobile unit transparently via the interface with the control plane entity of the other network and via the radio of this other network.

6. The method of claim 5, wherein passing the location update network information comprises passing periodic location update timer information.

7. The method of claim 6, comprising determining the timing for issuing periodic location update towards the network based on awareness of the interface between the control plane entities of the first and second networks and by considering a minimum of values for the periodic location update timer information provided by the control plane entity of the first network and by the control plane entity of the second network.

8. The method of claim 1, comprising receiving a location update message from the mobile unit indicating that the mobile unit has moved into at least a new tracking area of one of the first or second network.

9. A method of operating a paging controller in a wireless communication system including a first network that operates according to a first radio access technology and a second network that operates according to a second radio access technology, the first network including a first control plane entity and the second network including a second control plane entity, comprising:
    providing, to at least one first base station in the first network, a request to transmit a page to a first tracking area associated with a mobile unit, the first tracking area being defined in the first network; and
    providing, via an interface between the first control plane entity and the second control plane entity, a request to transmit the page to a second tracking area associated with the mobile unit, the second tracking area being defined in the second network, wherein providing the request to transmit the page to the first tracking area and the second tracking area comprises providing a request to transmit the page based on information indicating that the first tracking area overlaps the second tracking area.

10. A method of operating a paging controller in a wireless communication system including a first network that operates according to a first radio access technology and a second network that operates according to a second radio access technology, the first network including a first control plane entity and the second network including a second control plane entity, comprising:
- providing, to at least one first base station in the first network, a request to transmit a page to a first tracking area associated with a mobile unit, the first tracking area being defined in the first network;
- providing, via an interface between the first control plane entity and the second control plane entity, a request to transmit the page to a second tracking area associated with the mobile unit, the second tracking area being defined in the second network;
- providing, to the mobile unit, information indicating the relationships between the tracking areas and routing areas over the first and the second networks; and
- determining when the mobile does not need to update its location over a given network in response to determining that a location update has already been performed by controlling entities of the first and of the second networks.

11. A method of operating a paging controller in a wireless communication system including a first network that operates according to a first radio access technology and a second network that operates according to a second radio access technology, the first network including a first control plane entity and the second network including a second control plane entity, comprising:
- providing, to at least one first base station in the first network, a request to transmit a page to a first tracking area associated with a mobile unit, the first tracking area being defined in the first network;
- providing, via an interface between the first control plane entity and the second control plane entity, a request to transmit the page to a second tracking area associated with the mobile unit, the second tracking area being defined in the second network; and
- updating location information for the first or of the second network via location update messages exchanged between the mobile unit and the control plane entity of the first or second network, the location update messages being relayed transparently through the radio and the control entity of the other network and over the interface between the first control plane entity and the second control plane entity.

12. The method of claim 11 wherein updating the location information comprises updating periodic location update information.

13. A method of operating a paging controller in a wireless communication system including a first network that operates according to a first radio access technology and a second network that operates according to a second radio access technology, the first network including a first control plane entity and the second network including a second control plane entity, comprising:
- providing, to at least one first base station in the first network, a request to transmit a page to a first tracking area associated with a mobile unit, the first tracking area being defined in the first network;
- providing, via an interface between the first control plane entity and the second control plane entity, a request to transmit the page to a second tracking area associated with the mobile unit, the second tracking area being defined in the second network;
- providing, to the mobile unit, information indicating the relationships between the tracking areas and routing areas over the first and the second networks;
- receiving a location update message from the mobile unit indicating that the mobile unit has moved into at least a new tracking area of one of the first or second network and
- associating, at the first and second networks using information transmitted via the interface between the first control plane entity and the second control plane entity, the mobile unit with the new first tracking area or the new second tracking area.

14. The method of claim 13, wherein the first network is an overlay network providing partial coverage and the second network is an underlay network providing ubiquitous coverage, and comprising receiving, at the second network, a location update message from the mobile unit indicating that the mobile unit has moved into a new second tracking area.

15. The method of claim 14, comprising associating the mobile unit with the new second tracking area and at least one new first tracking area that overlaps a portion of the new second tracking area.

16. The method of claim 15, comprising providing, to the first network via the interface between the first control plane entity and the second control plane entity, information indicating the new second tracking area and said at least one new first tracking area.

* * * * *